No. 707,432. Patented Aug. 19, 1902.
O. LAUBER & F. STOCK.
COMBINED AXLE SEAT AND SHIELD FOR GUN CARRIAGES
(Application filed Sept. 13, 1901.)
(No Model.) 2 Sheets—Sheet 1.

No. 707,432. Patented Aug. 19, 1902.
O. LAUBER & F. STOCK.
COMBINED AXLE SEAT AND SHIELD FOR GUN CARRIAGES.
(Application filed Sept. 13, 1901.)

(No Model.) 2 Sheets—Sheet 2.

UNITED STATES PATENT OFFICE.

OTTO LAUBER AND FRIEDRICH STOCK, OF ESSEN, GERMANY, ASSIGNORS TO FRIED. KRUPP, OF ESSEN, GERMANY.

COMBINED AXLE-SEAT AND SHIELD FOR GUN-CARRIAGES.

SPECIFICATION forming part of Letters Patent No. 707,432, dated August 19, 1902.

Application filed September 13, 1901. Serial No. 75,302. (No model.)

*To all whom it may concern:*

Be it known that we, OTTO LAUBER, engineer, residing at 36 Grünstrasse, Essen-on-the-Ruhr-Holsterhausen, and FRIEDRICH STOCK, residing at 78 Märkischestrasse, Essen-on-the-Ruhr, Germany, have invented certain new and useful Improvements in a Combined Axle-Seat and Shield for Gun-Carriages, of which the following is a specification.

The following invention relates to wheeled gun-carriages, and is designed to arrange the axle-seats of the same in such a manner that they can be utilized as guards or shields. The desired object is attained according to this invention by constructing each axle-seat of plates hinged together and by providing means whereby the plates can be locked both in a bent position to form a seat and in a nearly plain or extended position to form a shield.

Figure 1:
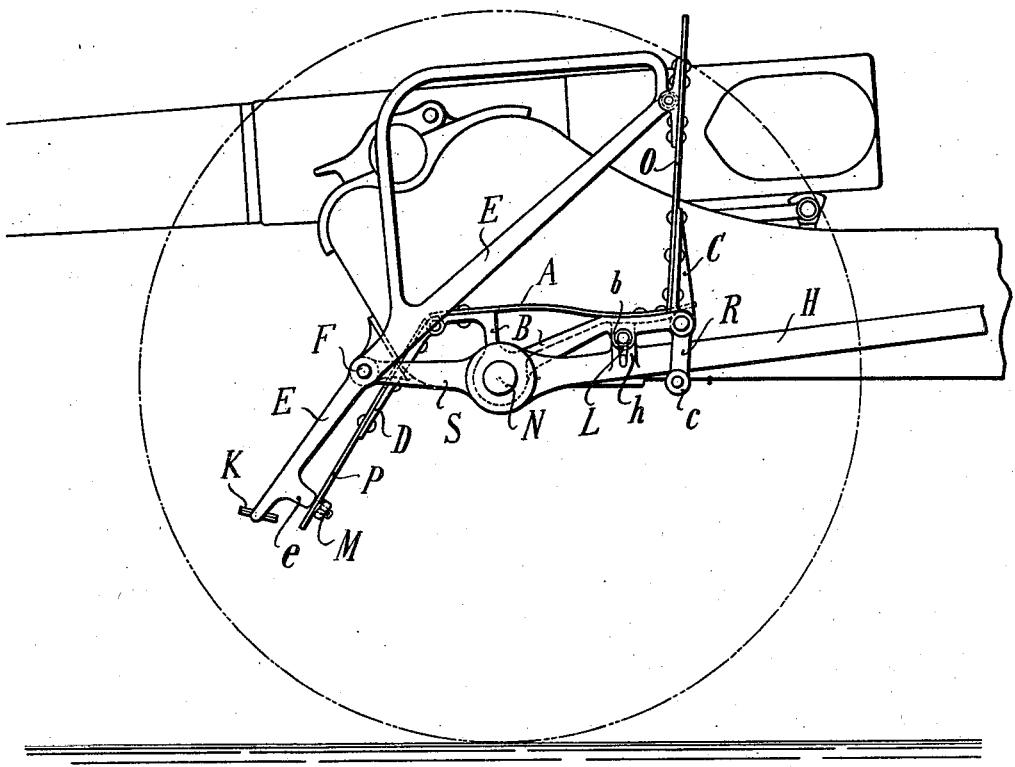
Figure 2:
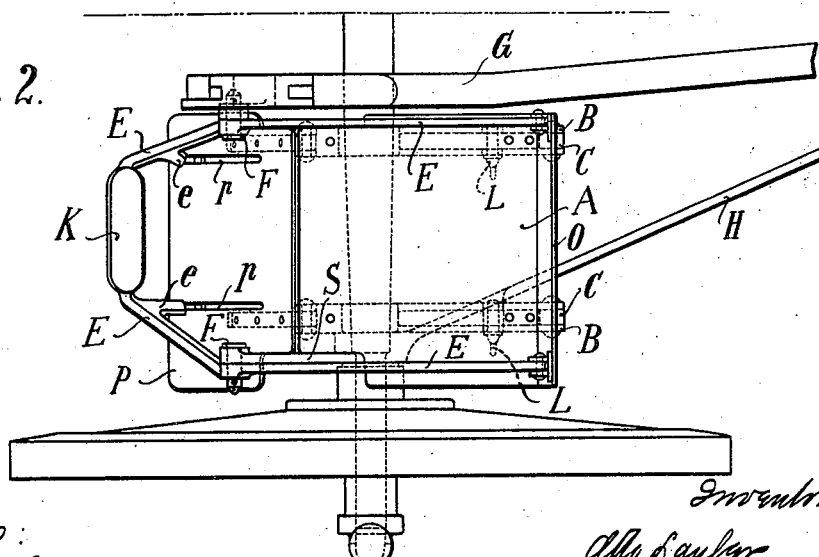
Figure 4:
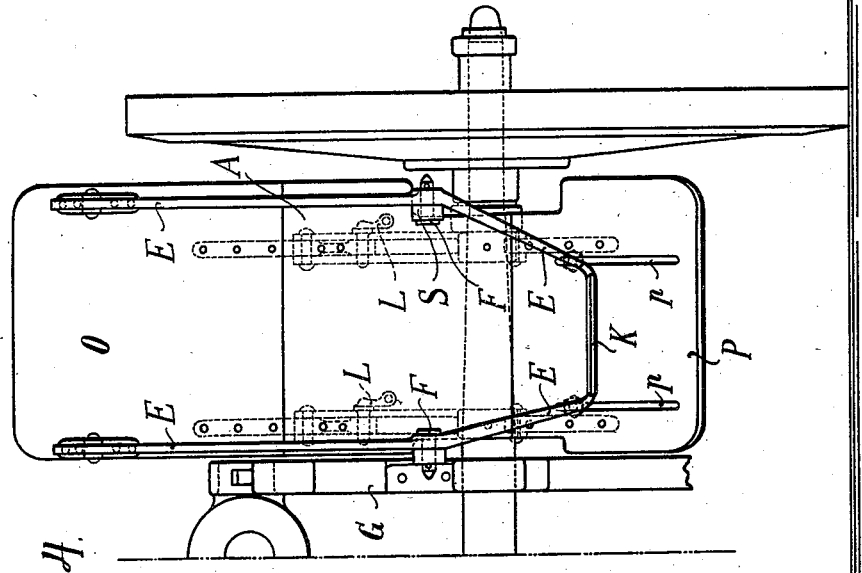
Figure 3:
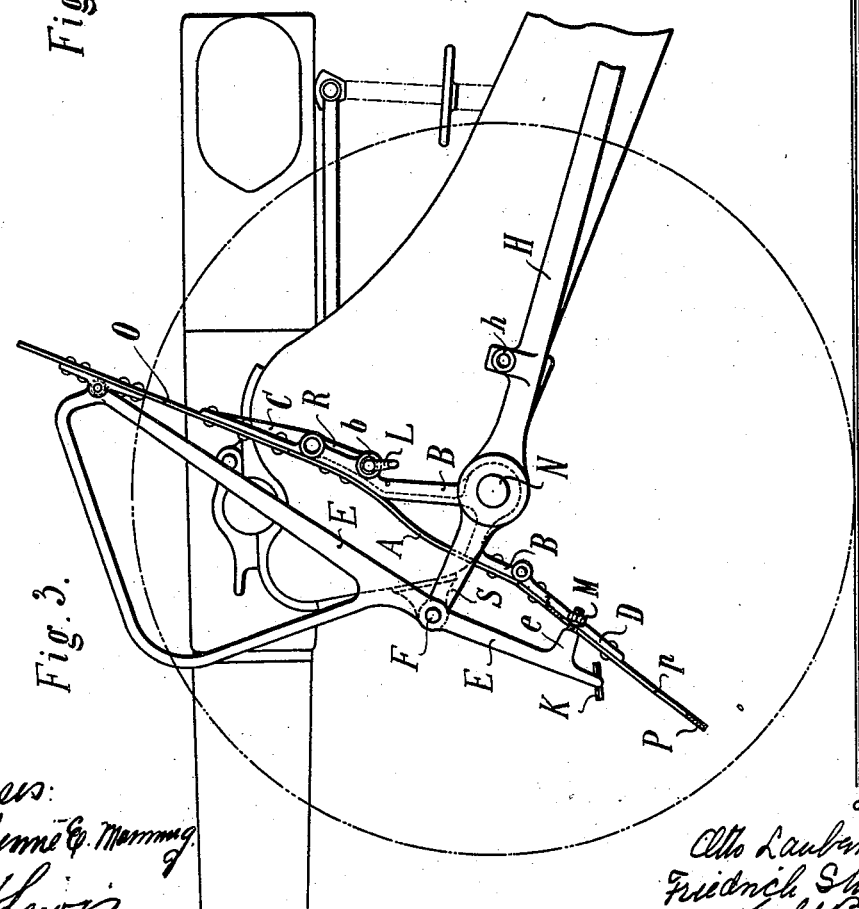

In the drawings, Figures 1, 2, 3, and 4 show by side and plan views a wheeled gun-carriage in which each axle-seat is formed by three plates hinged together. As the gun-carriage in respect to a vertical plane through the longitudinal axis of the gun is symmetrical, only one-half thereof is represented. Figs. 1 and 2 show side and plan views of the gun-carriage in its traveling position, the new attachment being in position for use as a seat. Figs. 3 and 4 are side and front views of the gun-carriage in the firing position, the new attachment being in position for use as a shield.

The construction of the new attachment will be described with reference to Figs. 1 and 2.

Each axle-seat consists of three plates A O P, hinged together, of which A is the seat, O the back, and P serves as a support for the legs. The seat-plate A is riveted to two angular bearers B, which are journaled on the axle N of the carriage, so as to turn thereon. The rear projecting ends of these carriers are of channel form ⌐⌐ in cross-section and are each provided with an eye *b*. At the same distance from the axle N of the carriage as the eyes *b* an eye *h* is placed on the draw-bar H, which eye projects between the cheeks of the carrier B lying toward the wheel of the carriage and is covered by the eye *b* of the same. Through the eyes *b* and *h* is placed a key-bolt L, so that the carrier B and the draw-bar H are locked together. Also the eye *b* of the carrier B lying toward the body of the carriage receives a key-bolt L, for a purpose described hereinafter more fully. To the free ends of the carrier B the plates O and P are jointed by means of the two hinges C and D. Each of the hinge-pieces C is provided with an extension-piece R, which terminates in an eye *c*. The eyes *c* are placed at the same distance from the turning-point of the hinge-joint as the eyes *b* of the carrier B. With the back O the upper ends of the two arm-supports E are hinged. By means of the turning-bolts F the arm-supports are pivoted on one side to an extension-arm S of the draw-bar H and on the other side to the wall G of the gun-carriage. The lower ends of the arm-supports extending over the turning-points F are firmly secured together by the foot-rest K and are provided with projections *e*, against which the plate P by means of screw-studs, which project through slots *p* in the plate, and by means of nuts M is secured. As can be easily perceived, the parts E, O, B, and S (or E, O, B, and the wall G of the gun-carriage) form a hinged quadrangle whose side S is rigidly connected to the body of the gun-carriage and whose side B is rigidly coupled to the adjacent side S, (through the elongation H,) by which means the entire system forms in this position a seat firmly secured to the gun-carriage. If it is desired to transform the seat, as shown in Figs. 1 and 2, into the position represented in Figs. 3 and 4 for firing—*i. e.*, to be utilized as a shield—the two key-bolts L are first drawn out of their sockets. By this means the connection between the carrier B and the draw-bar H is loosened. Thereupon the arm-supports E under simultaneous turning of the carriers B around the axle N are raised up until the joints B C, and with them the plates A O, are brought into a nearly straight line, and the eyes *c* will have come in line with the eyes *b*. During this movement a straightening of the joints B D and of the plate P relatively to the plate A takes place, while the plate P, with its slots *p*, slides on the screw-studs of the holders *e*. After the different parts have assumed the position shown in Figs. 3 and 4 the members B and C are rigidly coupled by inserting the key-bolts L into the holes or eyes *b c*. By this means the two adjoining sides B and O of the jointed quadrangle E O B S will be secured and a shield corresponding to the combined length of the parts of the seat will be formed. Reproductions of the traveling position of the seat from the firing position will follow, as will be readily seen in reverse manner by loosening the key-bolts, turning down the arm-supports, and bolting the draw-bar with the carrier lying above it. For securing the seat in its two positions it is naturally unimportant which adjoining sides of the quadrangle E S B O are coupled, for, as is well known, the stiff connection of any two adjoining sides of a jointed quadrangle produces a perfectly rigid system.

Having thus described our invention, the following is what we claim as new therein and desire to secure by Letters Patent:

1. In a wheeled gun-carriage, the combination with a plate revoluble on the carriage, of plates permanently hinged at their inner ends to said revoluble plate, and means locking the plates either in a bent position to form a seat or in a nearly-extended position to form a shield, substantially as specified.

2. In wheeled gun-carriages the combination of a seat-plate revoluble on the carriage, a back plate hinged to said seat-plate, arm-supports hinged to the back plate and to the carriage, the seat, back, arm-supports and carriage forming a jointed quadrangle, and means for rigidly connecting two adjacent sides of the jointed quadrangle, both in the bent and nearly-extended position of the seat and back plate, substantially as specified.

3. In wheeled gun-carriages the combination of a seat-plate revoluble on the carriage, a back plate hinged to said seat-plate, arm-supports hinged to the back plate and to the carriage, a leg-support plate hinged to the seat-plate and having sliding connection with the arm-supports, the seat, back, arm-supports and carriage forming a jointed quadrangle, and means for rigidly connecting two adjacent sides of the jointed quadrangle, both in the bent and in the nearly-extended position of the seat, back and leg-support plate, substantially as specified.

In testimony whereof we have hereunto set our hands in the presence of two subscribing witnesses.

OTTO LAUBER.
FRIEDRICH STOCK.

Witnesses:
WILLIAM ESSENWEIN,
PAUL BAHRS.